(12) United States Patent
Haskara et al.

(10) Patent No.: US 7,904,231 B2
(45) Date of Patent: Mar. 8, 2011

(54) METHOD FOR CONTROLLING COMBUSTION NOISE IN A COMPRESSION-IGNITION ENGINE

(75) Inventors: Ibrahim Haskara, Macomb, MI (US); Yue-Yun Wang, Troy, MI (US); Chol-Bum M Kweon, Rochester, MI (US); Frederic Anton Matekunas, Troy, MI (US); Paul Anthony Battiston, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 428 days.

(21) Appl. No.: 12/177,520

(22) Filed: Jul. 22, 2008

(65) Prior Publication Data

US 2010/0023240 A1    Jan. 28, 2010

(51) Int. Cl.
*F02D 41/30*    (2006.01)
*F02M 37/00*    (2006.01)

(52) U.S. Cl. ............... 701/103; 123/435; 123/406.22
(58) Field of Classification Search .......... 701/103–105, 701/102, 111; 123/435, 406.22, 406.26, 123/406.41, 406.45
See application file for complete search history.

(56) References Cited

U.S. PATENT DOCUMENTS 3,575,146 A * 4/1971 Creighton et al. ............ 123/299
6,378,487 B1 * 4/2002 Zukouski et al. ............. 123/435

FOREIGN PATENT DOCUMENTS

JP    2000-192843 A  *  7/2000
JP    2007-278098 A  * 10/2007

* cited by examiner

*Primary Examiner* — Hieu T Vo

(57) ABSTRACT

Combustion noise in a compression-ignition engine is controlled by measuring in-cylinder pressure of a cylinder of the compression-ignition engine, determining a combustion noise level based on the in-cylinder pressure measurement, and modifying a combustion control parameter based on the combustion noise level.

20 Claims, 4 Drawing Sheets

METHOD FOR CONTROLLING COMBUSTION NOISE IN A COMPRESSION-IGNITION ENGINE

TECHNICAL FIELD

This disclosure is related to compression-ignition engine control systems.

BACKGROUND

The statements in this section merely provide background information related to the present disclosure and may not constitute prior art.

Compression-ignition engines, such as diesel engines, operate by directly injecting a fuel into a combustion chamber. Manufacturers of compression-ignition engines have developed combustion modes for reducing engine-out emissions. Exemplary combustion modes include premixed charge compression ignition ('PCCI') and homogenous charge compression ignition ('HCCI'). The combustion modes can utilize advanced injection timing along with high rates of exhaust gas recirculation to create a premixed or more homogenous combustion mixture at the time of combustion. Compression-ignition engines utilizing the advanced combustion modes may exhibit increased pressure levels and increased pressure level variations within combustion chambers over other known compression-ignition engines. Compression-ignition engines utilizing the advanced combustion modes may exhibit high noise levels. High noise levels can be caused, for example, by oxygen, fuel, and pressure conditions inside the combustion chamber that are outside a desired range causing insufficient or mistimed combustion, and mistimed fuel injection within the combustion chamber. Pressure levels can vary among combustion cycles in engines utilizing high levels of recirculated EGR. Engines utilizing advance combustion timing can have higher pressure rise rates, which can result in increased noise levels. Known compression-ignition engines impose calibrated limits on air and fuel quantities over an operating range to control noise levels.

SUMMARY

Combustion noise in a compression-ignition engine is controlled by measuring in-cylinder pressure of a cylinder of the compression-ignition engine, determining a combustion noise level based on the in-cylinder pressure measurement, and modifying a combustion control parameter based on the combustion noise level.

BRIEF DESCRIPTION OF THE DRAWINGS

One or more embodiments will now be described, by way of example, with reference to the accompanying drawings, in which.

DETAILED DESCRIPTION

Figure 1:
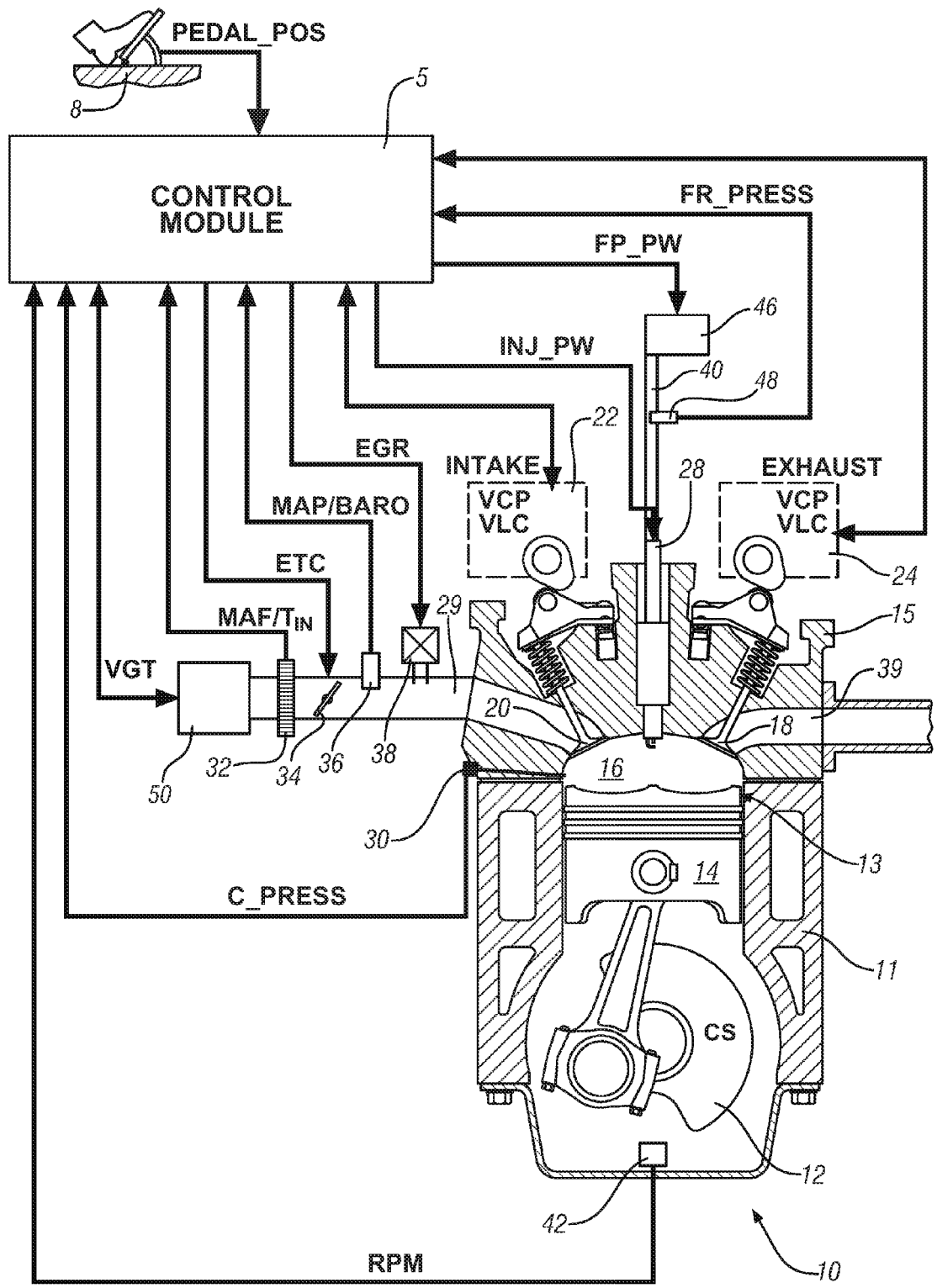
FIG. 1 is a schematic diagram, in accordance with the present disclosure.

Referring now to the drawings, wherein the showings are for the purpose of illustrating certain exemplary embodiments only and not for the purpose of limiting the same, FIG. 1 schematically illustrates a compression-ignition internal combustion engine 10 and a control module 5. The exemplary internal combustion engine 10 comprises a multi-cylinder device including an engine block 11, a crankshaft ('CS') 12, and a cylinder head 15. A plurality of cylinders 13 is formed in the engine block 11, each cylinder 13 containing a piston 14 slidably movable therein. Each piston 14 mechanically operatively connects to the crankshaft 12 via a piston rod, and the crankshaft 12 mounts to the engine block 11 on main bearings and rotates therein. Reciprocating linear motion of the pistons 14 translates to rotational motion of the crankshaft 12. An air intake system channels intake air to an intake manifold 29 which directs and distributes the intake air into a plurality of intake runners. The air intake system comprises airflow ductwork and devices for monitoring and controlling flow of the intake air. The devices preferably include a mass airflow sensor 32 for monitoring mass flow of the intake air and intake air temperature and providing respective output signals ('MAF') and ('$T_{IN}$') corresponding thereto. A throttle valve 34, preferably an electronically controlled device, controls the flow of fresh air into the intake manifold 29 in response to a control signal ('ETC'). A pressure sensor 36 in the intake manifold 29 monitors manifold absolute pressure and barometric pressure, and provides respective output signals ('MAP') and ('BARO') corresponding thereto. An external flow passage (not shown) connects engine exhaust to the air intake system for recirculating exhaust gases, and includes a flow control valve, referred to as an exhaust gas recirculation, or EGR valve 38, controlled in response to a control signal ('EGR'). The engine 10 can include other systems, including a turbocharger system 50 or, alternatively, a supercharger system to deliver intake air to the engine 10.

Each cylinder 13, reciprocating piston 14 and cylinder head 15 defines a variable volume combustion chamber 16. The crankshaft 12 rotates at the main bearings, in response to linear force applied thereto by the piston rods, as a result of combustion events in the combustion chambers 16. The cylinder head 15 contains one or more air inlet ports controlled by one or more intake valve(s) 20, one or more exhaust ports controlled by one or more exhaust valve(s) 18, and a fuel injector 28 operative to inject fuel directly into the combustion chamber 16. Opening and closing of the intake valve(s) 20 is controlled by operation of an intake valve system 22, which controls inflow of intake air to the combustion chamber 16. Opening and closing of the exhaust valves 18 is controlled by operation of an exhaust valve system 24 which controls exhaust of combustion products out of the combustion chamber 16. The crank sensor 42, located in proximity to the crankshaft 12, continuously generates a signal ('RPM') that can be processed by the control module 5 to indicate crank angle and engine speed.

The engine 10 includes a fuel injection system, comprising a plurality of high-pressure fuel injectors 28 each adapted to directly inject a quantity of fuel into one of the combustion chambers 16. The fuel injectors 28 are supplied pressurized fuel from a fuel distribution system including a common fuel rail 40. A pressure sensor 48 monitors fuel rail pressure within a fuel rail 40 and outputs a signal ('FR_PRESS') corresponding to the pressure to the control module 5.

The fuel distribution system preferably includes a high pressure (e.g., 1,800 bar/180 MPa) fuel pump 46 to deliver pressurized fuel to the fuel injector 28 via the fuel rail 40. Fuel rail pressure is determined by the control module 5 based on the operator torque request and the engine speed and controlled via fuel pump 46. The fuel injector 28 preferably comprises one of a solenoid-actuated or piezoelectric-actuated device having a nozzle placed through an opening in the cylinder head 15 to inject pressurized fuel into the combustion chamber 16. The injector nozzle comprises a fuel injector tip characterized by a number of openings, a spray angle, and a flow number representing a volumetric flow rate at a given pressure. An exemplary fuel injector nozzle comprises a 7-hole device having a 155-degree spray angle and a 370 flow number (in cc/30-s @100 bar). Fuel injector operating characteristics further comprise a minimum controllable flow rate, a maximum flow rate, and a dynamic range, each dependent upon fuel pressure and other parameters.

The intake valve system 22 controls air flow from the intake manifold 29 into each of the combustion chambers 16, including controlling opening and closing of the intake valve(s) 20. The exhaust valve system 24 controls flow of combusted gases from each of the combustion chambers to an exhaust manifold 39, including controlling opening and closing of the exhaust valve(s) 18. In one embodiment, the openings and closings of the intake valve(s) 20 and the exhaust valve(s) 18 are controlled with a dual camshaft system (as depicted), the rotations of which are linked and indexed with rotation of the crankshaft 12.

A pressure sensor 30 monitors in-cylinder pressure within the cylinder 13, having a signal output ('C_PRESS') which is monitored by the control module 5. The pressure sensor 30 can include a pressure transducer comprising piezoelectric materials for translating the in-cylinder pressure level to electric signals. The pressure sensor 30 is adapted to monitor in-cylinder pressure in real-time, including during combustion.

The control module 5 discerns a start of injection (hereafter 'SOI') and a corresponding position of the piston 14 (hereafter 'SOI angle') via input from the crank sensor 42 during ongoing operation of the engine 10. The SOI angle is the crank angle at which the fuel injector begins to provide a combustion charge via the main pulse to the combustion chamber. The SOI angle is measured relative to a top-dead-center (hereafter 'TDC'). TDC is a position of the crank shaft 12 at which the piston 14 is at a highest position of travel within the combustion chamber 16 correlating to a minimum volume of the combustion chamber 16.

In the exemplary engine 10, the control module 5 commands fuel injection pulses from the fuel injector 28 per combustion cycle for each cylinder 13. In one embodiment, the control module 5 commands a pilot pulse and a main pulse during each combustion cycle. The pilot pulse comprises an initial mass of fuel injected to initiate combustion. The main pulse provides power to drive torque generated by the engine 10. The fuel quantity of the main pulse is selected by the control module 5, based on the operator input. When the control module 5 modifies the SOI angle, the control module 5 also modifies a corresponding crank angle at which the pilot pulse is injected. The control module 5 monitors input signals from an operator, for example, through a position of a pedal 8. A position sensor on the pedal 8 outputs a signal ('PEDAL_POS') to the control module 5 that is utilized to determine an operator torque request.

The control module 5 further monitors exemplary input signals including brake pedal position, the engine speed, the engine combustion, the mass air flow rate, the intake air temperature, the manifold pressure, barometric pressure, coolant temperature, and other ambient conditions. The control module 5 executes algorithmic code stored therein to control various actuators to control engine operation. This includes determining, preferably from lookup tables in a memory device in the control module 5, instantaneous control settings for EGR valve 38 position, intake and exhaust valve timing and/or lift set points, and fuel injection timing, and calculating burned gas fractions in the intake and exhaust systems. The control module 5 executes control schemes based upon operator inputs, ambient conditions, and engine operating conditions, and controls actuators thereby. The control module 5 individually and selectively controls each fuel injector 28 to inject precise quantities of fuel at specific times during ongoing operation.

The control module 5 preferably comprises a general-purpose digital computer including a microprocessor or central processing unit, storage mediums comprising non-volatile memory devices including read only memory (ROM) and electrically programmable read only memory (EPROM), random access memory (RAM) storage media, a high speed clock, analog-to-digital (A/D) and digital-to-analog (D/A) circuitry, and input/output circuitry and devices (I/O) and appropriate signal conditioning and buffer circuitry. The control module 5 has a set of control algorithms, comprising resident program instructions and calibrations stored in the non-volatile memory and executed to provide the respective functions of each computer. The algorithms are executed during preset loop cycles such that each algorithm is executed at least once each loop cycle. Algorithms are executed by the central processing unit to monitor inputs from the aforementioned sensing devices and execute control and diagnostic routines to control operation of various actuators, using preset calibrations. Loop cycles are executed at regular intervals, for example each 3.125, 6.25, 12.5, 25 and 100 milliseconds during ongoing operation of the engine 10 and vehicle. Alternatively, algorithms may be executed in response to occurrence of an event.

The description of the control module 5 and the internal combustion engine 10 is meant to be illustrative, and not restrictive to the disclosure. In operation, the control module 5 controls each fuel injector 28 to inject an initial quantity of fuel into the combustion chamber 16 during each combustion cycle to form a combustion pulse during low to medium load operation.

The control module 5 controls the throttle valve 34 to control mass flow of intake air into the engine via control signal ETC. In one embodiment, the throttle valve 34 is commanded to wide open throttle and the turbocharger system 50 is utilized to control manifold pressure by modifying both an intake air quantity and a recirculated exhaust gas quantity. The turbocharger system 50 preferably comprises a variable geometry turbine. The control module 5 sends a signal 'VGT' to direct the angle of vanes of the variable geometry turbine. The angle of the vanes is measured with a VGT position sensor to provide feedback control to the control module 5. By controlling the angle of the vanes of the variable geometry turbine, the control module 5, controls the level of pressure boost provided by the turbocharger system thereby controlling the intake air quantity and the recirculated exhaust gas quantity. In alternate embodiments, a supercharger system can be utilized to modify the manifold pressure in analogous fashion.

The control module 5 controls exhaust gas quantity by controlling opening of the exhaust gas recirculation valve 38 via control signal EGR. By controlling opening of the exhaust gas recirculation valve 38, the control module 5 controls a recirculated exhaust gas rate and the ratio of exhaust gas quantity to intake gas quantity.

On systems so equipped, the control module 5 controls operation of the intake valve system 22 via a control signal ('INTAKE') and controls operation of the exhaust valve system 24 via a control signal ('EXHAUST') to control one or more of timing, lift, and duration of opening and closing the intake valves 20 and exhaust valves 18.

Figure 2:
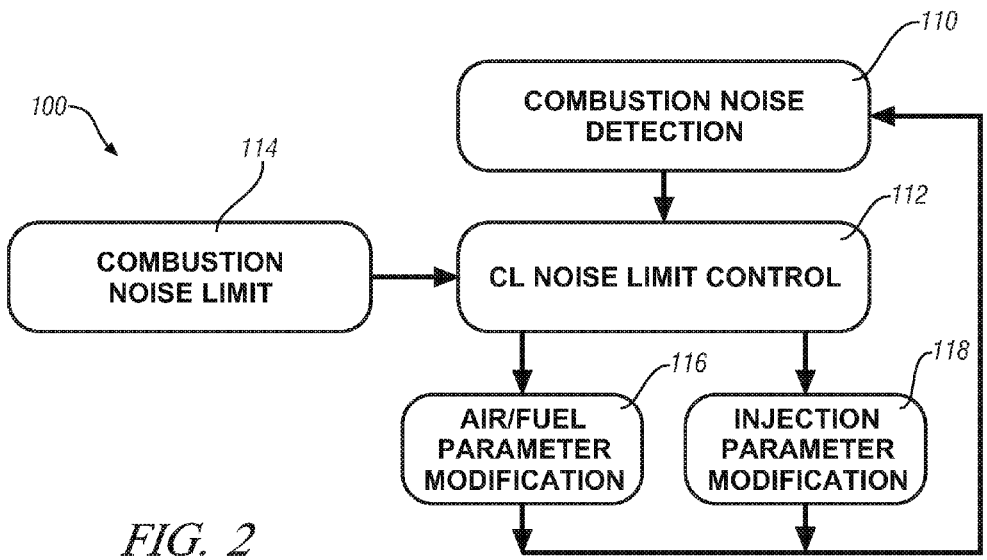
FIG. 2 is a process flow diagram of a method for controlling combustion noise in a compression-ignition engine in accordance with an exemplary embodiment of the present disclosure.

FIG. 2 depicts a method 100 for controlling combustion noise in the engine 10. The control module 5 monitors in-cylinder pressure to determine a combustion noise level (110). The pressure sensor 30 continuously measures in-cylinder pressure within the cylinder 13 and sends the in-cylinder pressure measurements to the control module 5. The crank sensor 42 continuously measures crank angles and sends the crank angle measurements to the control module 5. The control module 5 stores the in-cylinder pressure measurements and corresponding crank angles over a period of time in a storage device.

The control module 5 utilizes the stored in-cylinder pressure measurements to determine the combustion noise level. In one embodiment, the control module 5 determines the derivative of the in-cylinder pressure (P) over an elapsed time period to determine the combustion noise level (N). The combustion noise level (N) is based on a maximum change in the in-cylinder pressure with respect to time (t) described in equation 1 below:

$$N = \frac{dP}{dt}\bigg|_{max} \quad [1]$$

In one embodiment, the control module 5 determines the combustion noise level (N) based on a ringing intensity as described in equation 2 below:

$$N = \frac{1}{2\gamma} \frac{\left(\beta \frac{dP}{dt}\big|_{max}\right)^2}{P_{max}} \sqrt{\gamma R T_{max}} \quad [2]$$

where $P_{max}$ is a maximum in-cylinder pressure level, $\gamma$ and $\beta$ are calibrated constants; R is the ideal gas law constant; and $T_{max}$ is a temperature determined utilizing the value $P_{max}$, a volume of the combustion chamber 16 determined based on the crank angle at $P_{max}$, and the ideal gas law equation. Since the time is correlated with a crank angle, alternate forms of equations 1 and 2 can utilize the crank angle in place of time (t).

In alternate embodiments, the control module 5 determines noise levels utilizing other metrics such as linear or nonlinear combustion regression metrics that are functions of a maximum in-cylinder pressure, a maximum change in in-cylinder pressure over time, and in-cylinder pressures correlated with crank angle position. In other alternate embodiments, the control module 5 determines noise levels from analog processing of pressure signals, for example band-pass filtering of signals within a predetermined frequency range. Further, noise levels can be determined from digital processing of pressure signals.

The control module 5 establishes a noise level threshold (114). The combustion noise level threshold is a maximum permissible noise level that can be associated with engine durability and engine performance. The control module 5 accesses the combustion noise level threshold in the storage device. The combustion noise level threshold can be a precalibrated value or can be calculated utilizing input values such as sensor inputs to the control module 5.

The control module 5 utilizes the determined noise level and the combustion noise level threshold in a control strategy (112). The control module 5 utilizes the control strategy (112) to control a combustion control parameter based on the determined noise level. The combustion control parameter is a parameter that can be adjusted to affect combustion reactions within the combustion chamber 16. For example, adjusting the combustion control parameter can affect combustion rate, combustion timing, and combustion energy. Exemplary combustion control parameters include the fuel injection timing, pilot fuel injector quantity, fuel rail pressure, recirculated exhaust gas quantity, intake gas quantity, and intake manifold pressure. Exemplary embodiments are described in which fuel injection timing is controlled by controlling the SOI angle. However, in alternate exemplary embodiments, controlling fuel injection timing comprises controlling the timing of other fuel injection events in addition to or instead of controlling the SOI angle. For example, controlling fuel injection timing can include controlling timing at which the fuel injector 28 dispenses a maximum amount of fuel or controlling an end of fuel injection.

The exemplary method 100 can simultaneously control an air/fuel combustion control parameter (116) and a fuel injection combustion control parameter (118). The air/fuel combustion control parameter is associated with a first response time and the fuel injection combustion control parameter is associated with a second response time.

Exemplary air/fuel combustion control parameters include combustion control parameters associated with transient times of multiple combustion cycles when modifying the air/fuel combustion control parameter from a first level to a second level. Controlling air/fuel combustion control parameters can include controlling the recirculated exhaust gas quantity, intake gas quantity, and fuel rail pressure.

The recirculated exhaust gas quantity is a level of recirculated exhaust gas in the combustion chamber 16 prior to combustion. The intake gas quantity is a level of intake gas in the combustion chamber 16 prior to combustion. In an exemplary embodiment, recirculated exhaust gas quantity is controlled by the position of the EGR valve 38 and the intake gas quantity is controlled by a level of boost provided by the turbocharger system. In other exemplary embodiments exhaust gas quantity along with the ratio of intake gas quantity and exhaust gas quantity can be further be controlled by, for example, varying valve timing through control of the intake valve system 22 and/or the exhaust valve system 24, and by controlling actuators of superchargers to deliver the intake gas to the engine 10.

Exemplary fuel injection combustion control parameters are associated with transient times of a single combustion cycle when modifying the combustion control parameter from a first level to a second level. Controlling fuel injection control parameters (118) can include controlling the pilot injection quantity, the SOI angle for the main injection and the angle for the pilot injection. The pilot injection quantity can be controlled by modifying the actuator of the fuel injector 28 to increase or decrease an amount of fuel injected in the combustion chamber 16. The SOI angle is controlled by modifying the timing at which the combustion fuel pulse is injected into the combustion chamber 16 to correspond to a selected crank angle.

Method 100 includes modifying both the air/fuel combustion control parameter (116) and the fuel injection combustion control parameter (118) when the combustion noise level is above the threshold noise level. The method 100 modifies the SOI angle from a base level to calibrated control level in response to determining the combustion noise level above the threshold noise level. If the combustion noise level is above the threshold noise level when the SOI angle is modified to the calibrated control level, the intake gas quantity to recirculated exhaust gas quantity ratio is modified from a base level to a calibrated control level to reduce the combustion noise level below the threshold noise level. In alternate embodiments, both the SOI angle and the intake gas to recirculated exhaust gas ratio are modified simultaneously when the combustion noise level is above the threshold noise level.

Further, the fuel injection combustion control parameter can be modified to control noise that is above the threshold noise level when the air/fuel combustion control parameter is modified from a first level to a second level based on an engine operating point independent from the combustion noise level such as, for example, during transient operation of the engine 10.

In one embodiment, the in-cylinder pressure measurement can be correlated with crank angle to identify a potentially contributing factor in generating noise levels above a threshold noise level—for example, when noise levels above the threshold noise level within a crank angle range at which a pilot pulse is initiated indicates a failed initiation of the pilot pulse. When the failed initiation of the pilot pulse is detected, the control module 5 can command the actuators of the fuel injector 28 to increase the level of fuel delivered during the pilot pulse.

In one embodiment, the air/fuel combustion control parameter can be modified to control noise without modifying the fuel injection combustion control parameter. In one embodiment, the fuel injection combustion control parameter can be modified to control noise above the combustion noise level threshold without modifying the air/fuel control parameter.

Figure 3:
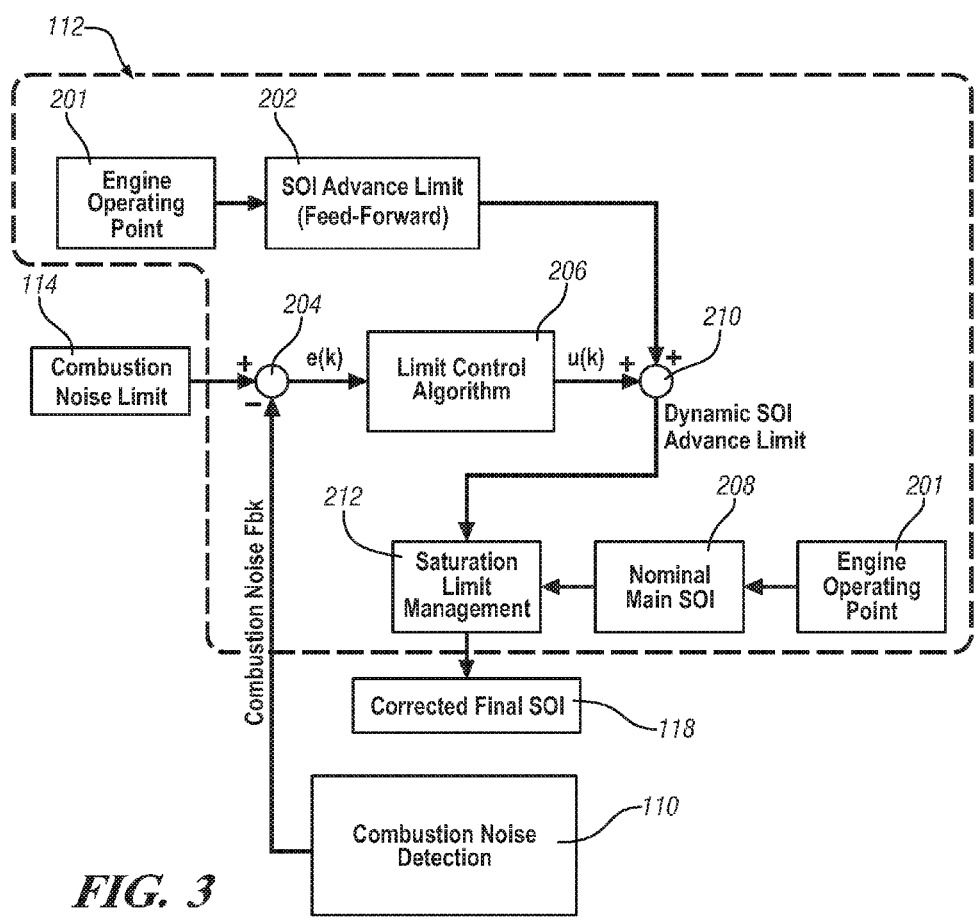
FIG. 3 is a process flow diagram of a first control strategy utilized in the method of FIG. 2 in accordance with an exemplary embodiment of the present disclosure.
Figure 4:
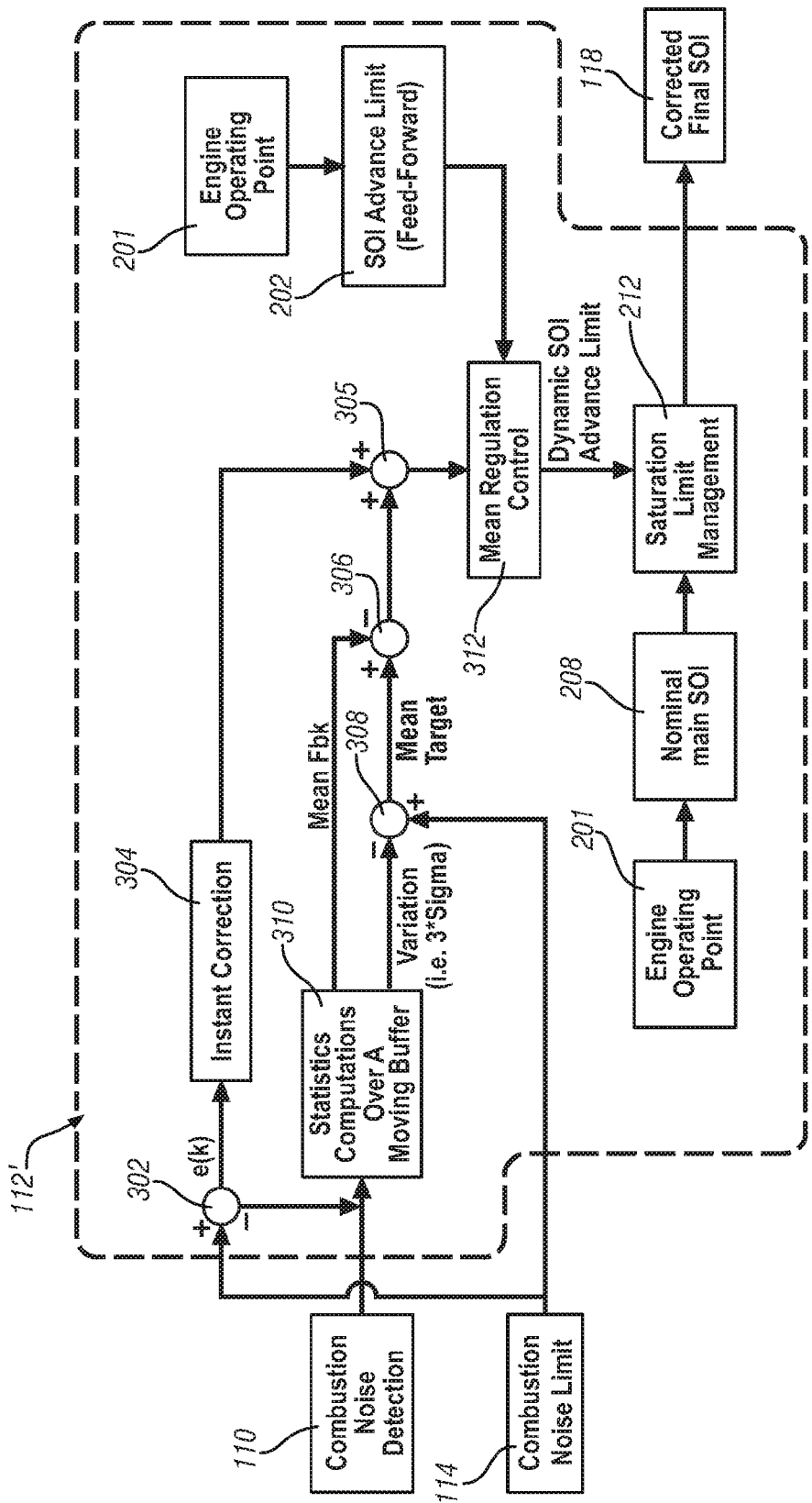
FIG. 4 is a process flow diagram of a second control strategy utilized in the method of FIG. 2 in accordance with an exemplary embodiment of the present disclosure.
Figure 5:
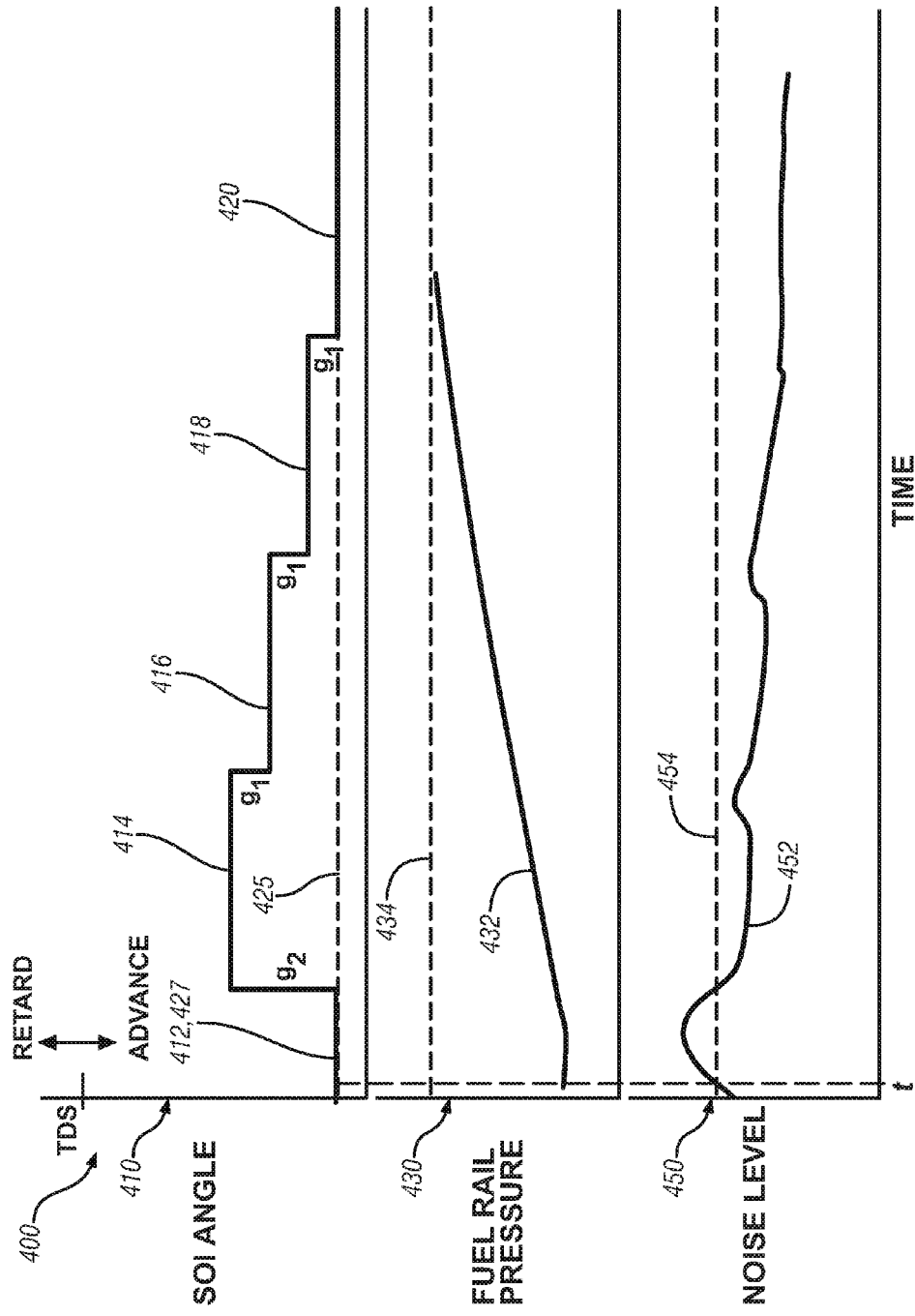
FIG. 5 is a graphical representation of combustion noise levels controlled utilizing the method for controlling combustion noise in a compression-ignition engine of FIG. 2 in accordance with an exemplary embodiment of the present disclosure.

Method 100 can comprise one of several exemplary control strategies for controlling combustion noise including exemplary first and second control strategies 112 and 112' as illustrated in FIG. 3 and FIG. 4, respectively. FIG. 3 depicts the exemplary first control strategy 112 and FIG. 5 depicts an exemplary graph 400 of combustion noise levels controlled utilizing the method 100 comprising a graph 410 depicting an SOI angle 412, a graph 430 depicting fuel rail pressure level 432 within the fuel rail 40, and a graph 450 depicting a determined noise level 452 versus time when the exemplary first control strategy 112 is executed. The control strategy 112 is executed in response to noise level 452 rising above the threshold noise level 454 at time t.

The fuel pump 46 is commanded to meet a commanded fuel rail pressure 434 within the fuel rail 40. The fuel rail pressure level 432 increases over multiple combustion cycles to meet the commanded fuel rail pressure 434.

Referring again to FIG. 3, the control module 5 receives the operator torque request and the engine speed (201). The control module 5 utilizes the operator torque request and the engine speed to determine an advanced limit SOI angle (202). The advanced limit SOI angle is a boundary condition for operating SOI during nominal operating conditions. The advanced limit SOI angle is determined utilizing precalibrated limits associated with engine operating points, that is, the engine speed and the operator torque request. The precalibrated limits for the advanced limit SOI angle are associated with operating costs independent of noise level such that maintaining the SOI angle within the precalibrated limits will maintain operation of the engine 10 at or above desired cost levels.

The combustion noise level threshold (114) and the determined combustion noise levels (110) are provided to an error function (204). The control strategy (112) determines a combustion noise error utilizing an error function (204). The error function determines an error value e(k) at a current engine combustion cycle (k) utilizing a threshold value $y_T(k)$ and a response value y(k) as shown in equation 3 below:

$$e(k)=y_T(k)-y(k) \quad [3]$$

The threshold value $y_T(k)$ corresponds to the combustion noise level threshold and the response value y(k) corresponds to the determined noise level.

The error value e(k) is utilized in a control function (206). In one embodiment, the control function adds a gain value wherein the gain value is based on whether the error value is positive or negative. An exemplary control function for determining the control value u(k+1) for an engine combustion cycle (k+1) based on the control function u(k) for the current engine combustion cycle (k) is shown in equations 4 and 5 below:

$$u[k+1]=u(k)+g_1, \text{ if } e(k) \geq 0 \quad [4]$$

$$u[k+1]=u(k)+g_2, \text{ if } e(k) < 0 \quad [5]$$

The first gain value $g_1$ and the second gain value $g_2$ can modify the combustion control parameter in opposite directions. In an exemplary embodiment, the first gain value $g_1$ advances of the SOI angle (changes the position of the SOI angle in a direction matching the direction of movement of the crank shaft) and the second gain value $g_2$ retards the SOI angle (changes the position of the SOI angle in a direction opposite the direction of movement of the crank shaft.)

When the response value y(k) is greater than the combustion noise level threshold value $y_T(k)$, the second gain value $g_2$ is added to the control value u(k) to retard the SOI angle as shown by commanded SOI 414 in FIG. 5. In an exemplary embodiment, the second gain value corresponds to a 0.9 degree modification of the SOI angle. When the response value y(k) is less than the combustion noise level threshold value $y_T(k)$, the first gain value $g_1$ is added to the control value u(k+1) to advance the SOI angle. In an exemplary embodiment, the second gain value corresponds to a 0.3 degree modification of the SOI angle.

The advance limit 427 is modified based on the control value u(k+1) (210) to determine a modified advanced limit SOI angle. The control module 5, utilizes the operator torque request and the engine speed to determine a base SOI angle (208). The base SOI angle is determined utilizing a cost calculation in which a cost associated with desired powertrain operating conditions, such as, for example, a desire fuel efficiency level. The base SOI angle is determined to be an angle within the advance limit SOI angle.

The control module 5 determines a commanded SOI angle (212). The commanded angle is determined as the greater (more retarded) of the modified advanced limit SOI angle and the base SOI angle. By commanding SOI angle as the greater of the modified advanced limit SOI angle and the base SOI angle, the commanded SOI angle will not be less (more advanced) than the base SOI angle, and therefore the modified advance limit SOI angle will not be utilized when the saturation limit is reached when the combustion noise level is below the threshold noise level.

The control module 5 controls the fuel injection combustion control parameter (118). In particular, the control module 5 controls timing of the fuel injectors 28 to control injection timing to meet the command SOI angle. The control module 5 modifies injection timing in each of the plurality of cylinders 13 by taking pressure measurements from pressure sensors 30, determining noise levels based on the pressure measurements and controlling timing of actuators of the fuel injectors 28 within each cylinder 13 based on the combustion noise levels.

Referring again to FIG. 5, the control module 5 modifies a commanded SOI angle 412 at a first combustion cycle to a commanded SOI angle 414 during a second combustion cycle, when the control module 5 determines the combustion noise level 452 is above the threshold noise level 454. The difference between the SOI angle 412 and the SOI angle 414 corresponds to the gain value $g_2$. When the combustion noise level 452 is below the threshold noise level 454, the control module 5 commands SOI angles 416, 418, and 420 at third, fourth, and fifth combustion cycles, respectively. The SOI angles 416, 418, 420 are advanced with respect to the SOI angle of the previous combustion cycle relative to TDC by a level corresponding to the gain value $g_1$ to revert to operation at a base SOI angle 425 when the combustion noise level is below the threshold noise level.

FIG. 4 depicts the exemplary second control strategy 112'. The combustion noise level threshold (114) and the determined the combustion noise levels (110) are provided to an error function (302). The error function determines an error value e(k) and provides the error value to an instant correction function (304). The instant correction function (304) outputs correction value as a function of the error value e(k). For example, the instant correction function can utilizes a polynomial function or a linear function to determine the output correction value.

The probability density function determines statistical properties of the combustion noise level recorded on the storage device including the mean combustion noise level, the combustion noise level variance, and the standard deviation of combustion noise (310). The statistical properties are utilized to determine a modified noise level threshold level (308) such that the noise levels within the combustion noise level variance are less than a base threshold. The base threshold noise level corresponds to a maximum permissible noise level. The modified noise level threshold and the mean noise level feedback are used to determine an error signal for the mean regulation control utilizing an error function (306).

The mean regulation control generates a modified advance limit value (312) utilizing the error signals from the error function (306) and the correction function 304 as well as the advanced limit SOI angle (202). The mean regulation control generates the modified advanced limit value utilizing a proportional-integral controller to adjust the control variable in order to drive the error between feedback and target to zero. The command SOI angle is determined as the greater of the modified advanced limit SOI angle and base SOI angle relative to TDC (212). The control module 5 controls timing of the fuel injectors 28 to control the injection timing at the determined SOI (118). By utilizing the variance in the combustion noise levels to control the combustion noise levels, the control strategy 112' can operate the engine 10 near the threshold noise limit without jittering caused by continuously advancing and retarding the SOI angle.

The disclosure has described certain preferred embodiments and modifications thereto. Further, modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling combustion noise in a compression-ignition engine, the method comprising:
   measuring in-cylinder pressure of a cylinder of the compression-ignition engine;
   determining a combustion noise level based on the in-cylinder pressure measurement; and
   modifying a combustion control parameter based on the combustion noise level.

2. The method of claim 1, wherein modifying the combustion control parameter based on the combustion noise level comprises modifying a start of injection angle and modifying a second combustion control parameter.

3. The method of claim 2, wherein modifying the combustion control parameter based on the combustion noise level comprises retarding the start of injection angle when the combustion noise level is greater than a threshold noise level.

4. The method of claim 3, further comprising:
   modifying a fuel rail pressure from a first pressure level to a second pressure level; and
   subsequently advancing the start of injection angle when the combustion noise level is less than the threshold noise level.

5. The method of claim 3, further comprising:
   modifying a recirculated exhaust gas quantity from a first quantity to a second quantity; and
   subsequently advancing the start of injection angle when the combustion noise level is less than the threshold noise level.

6. The method of claim 5, wherein the recirculated exhaust quantity is modified from the first quantity to the second quantity utilizing a turbocharger system.

7. The method of claim 3, further comprising:
   modifying an intake gas quantity from a first quantity to a second quantity; and
   subsequently advancing the start of injection angle when the combustion noise level is less than the threshold noise level.

8. The method of claim 2, further comprising:
   determining a base start of injection angle utilizing an operator torque request and an engine speed; and
   determining a modified start of injection angle utilizing the base start of injection angle.

9. The method of claim 1, wherein the combustion control parameter is one of a fuel-injection timing, a fuel rail pressure, a pilot pulse quantity, a recirculated exhaust gas quantity, and an intake gas quantity.

10. The method of claim 1, comprising:
    identifying insufficiency of a pilot pulse quantity when the combustion noise level associated with a crank angle range is above a threshold; and
    increasing the pilot pulse quantity when the insufficiency is identified.

11. The method of claim 1, wherein determining a combustion noise level based on the in-cylinder pressure measurement comprises determining a change of in-cylinder pressure.

12. The method of claim 1, wherein determining the combustion noise level based on the in-cylinder pressure measurement comprises calculating a ringing intensity level based on the in-cylinder pressure measurement.

13. The method of claim 1, comprising determining statistical properties of the combustion noise level and modifying a threshold noise level based on the statistical properties.

14. Method for controlling combustion noise in a compression-ignition engine, the method comprising:
   monitoring an in-cylinder pressure level of a cylinder of the compression ignition engine;
   determining a combustion noise level based on the in-cylinder pressure level; and
   modifying a first combustion control parameter associated with a first response time and a second combustion control parameter associated with a second response time based on the combustion noise level.

15. The method of claim 14, further comprising:
   modifying the first combustion control parameter from a respective first level to a respective second level when the combustion noise level is above a threshold noise level;
   modifying the second combustion control parameter from a respective first level to a respective second level; and
   modifying the first combustion from the respective second level to the respective first level when combustion noise level is below the threshold noise level.

16. The method of claim 15, wherein the first combustion control parameter is a start of injection angle.

17. The method of claim 15, wherein the second combustion control parameter comprises one of fuel rail pressure, recirculated exhaust gas quantity, and intake air quantity.

18. A method of controlling combustion noise in a compression-ignition engine including a cylinder, a fuel injector, a pressure sensor for measuring in-cylinder pressure, an exhaust gas recirculation valve and a throttle valve, the method comprising:
   measuring an in-cylinder pressure level of the cylinder utilizing the pressure sensor;
   determining a combustion noise level based on the in-cylinder pressure level;
   modifying fuel injection timing of the fuel injector based on the combustion noise level; and
   modifying at least one of a position of the throttle valve and a position of the exhaust gas recirculation valve based on the combustion noise level.

19. The method of claim 18, further comprising:
   modifying the position of the throttle valve and the position of the exhaust gas recirculation valve based on the combustion noise level.

20. The method of claim 18, wherein the fuel injection timing, the position of the throttle valve, and the position of the exhaust gas recirculation valve are modified based on the combustion noise level above a threshold noise level.

* * * * *